(12) United States Patent
Kong et al.

(10) Patent No.: US 12,182,664 B2
(45) Date of Patent: Dec. 31, 2024

(54) QUANTUM CHIP SYSTEM, QUANTUM COMPUTING PROCESSING SYSTEM AND ELECTRONIC APPARATUS

(71) Applicant: Origin Quantum Computing Technology Co., Ltd., Anhui (CN)

(72) Inventors: Weicheng Kong, Anhui (CN); Yongjie Zhao, Anhui (CN)

(73) Assignee: ORIGIN QUANTUM COMPUTING TECHNOLOGY CO., LTD., Anhui (CN)

( * ) Notice: Subject to any disclaimer, the term of this patent is extended or adjusted under 35 U.S.C. 154(b) by 0 days.

(21) Appl. No.: 17/287,759

(22) PCT Filed: Jul. 17, 2020

(86) PCT No.: PCT/CN2020/102572
§ 371 (c)(1),
(2) Date: Apr. 22, 2021

(87) PCT Pub. No.: WO2021/082533
PCT Pub. Date: May 6, 2021

(65) Prior Publication Data
US 2022/0309376 A1    Sep. 29, 2022

(30) Foreign Application Priority Data
Oct. 29, 2019  (CN) .......................... 201911039273.6

(51) Int. Cl.
*G06N 10/40* (2022.01)
*G06N 10/20* (2022.01)
*G06N 10/80* (2022.01)

(52) U.S. Cl.
CPC ............. *G06N 10/40* (2022.01); *G06N 10/20* (2022.01); *G06N 10/80* (2022.01)

(58) Field of Classification Search
CPC .... G06F 9/3877; G06F 9/30101; G06F 9/382; G06F 9/30; G06F 9/30196; G06F 15/16;
(Continued)

(56) References Cited

U.S. PATENT DOCUMENTS

2018/0046933 A1    2/2018  La Cour et al.
2018/0330266 A1*   11/2018 Simmons ............... G06N 10/00
(Continued)

FOREIGN PATENT DOCUMENTS

| CN | 108780129 A | 11/2018 |
|---|---|---|
| CN | 109217939 A | 1/2019 |
| CN | 109376870 A | 2/2019 |
| CN | 109683086 A | 4/2019 |
| CN | 109685216 A | 4/2019 |
| CN | 110942152 A | 3/2020 |

OTHER PUBLICATIONS

Bardin, Joseph C. et al., "Design and Characterization of a 28-nm Bulk-CMOS Cryogenic Quantum Controller Dissipating Less Than 2mW at 3K." IEEE Journal of Solid-State Circuits, Nov. 2019, 54(11):3043-3060.
(Continued)

*Primary Examiner* — Binh C Tat
(74) *Attorney, Agent, or Firm* — SALIWANCHIK, LLOYD & EISENSCHENK

(57) ABSTRACT

Embodiments of the disclosure provide a quantum chip system, a quantum computing processing system and an electronic apparatus, wherein one quantum chip system includes at least one first qubit, each first qubit includes at least two control electrodes, and a first event register for controlling the control electrode, wherein each first event register is configured for storing a control signal of the control electrode, and each first qubit corresponds to at least two first event registers.

11 Claims, 3 Drawing Sheets

(58) Field of Classification Search
CPC ...... G06F 9/30043; G06F 9/355; G06F 1/022; G06F 1/0321; G06F 1/0328; G06F 1/0342; G06F 1/06; G06F 1/08; G06F 11/10; G06F 11/1048; G06F 11/1068; G06F 30/30; G06F 7/5443; G06F 8/41; G06F 9/22; G06F 9/223; G06F 9/3017; G06F 9/3802; G06F 9/3867; G06F 11/0793; G06F 11/14; G06F 8/447; G06F 9/30007; G06F 9/3013; G06F 9/30145; G06F 9/3016; G06F 9/3818; G06F 9/3851; G06F 9/3858; G06F 9/3861; G06F 12/0238; G06F 15/7817; H01F 6/06; G06N 10/00; G06N 10/40; G06N 3/04; G06N 10/80; G06N 3/02; G06N 3/08; G06N 20/00; G06N 20/10; G06N 3/045; G06N 3/088; G06N 10/20; G06N 10/70; G06N 7/01; H01L 2924/00; H01L 2924/00014
USPC .................................................. 716/100–106
See application file for complete search history.

(56) References Cited

U.S. PATENT DOCUMENTS

| 2019/0042264 | A1* | 2/2019 | Zou ..................... G06F 9/30196 |
| 2019/0042970 | A1* | 2/2019 | Zou ..................... G06F 9/30101 |
| 2019/0042971 | A1* | 2/2019 | Zou ........................ G06F 15/16 |
| 2019/0042973 | A1* | 2/2019 | Zou ..................... G06F 9/30101 |
| 2019/0043968 | A1* | 2/2019 | Lampert ........... H01L 29/66984 |
| 2019/0049495 | A1  | 2/2019 | Ofek et al. |
| 2019/0303788 | A1  | 10/2019 | Kelly et al. |

OTHER PUBLICATIONS

Murali, Prakash et al., "Software Mitigation of Crosstalk on Noisy Intermediate-Scale Quantum Computers." Proceedings of the Twenty-Fifth International Conference on Architectural Support for Programming Languages and Operating Systems, 2020, pp. 1001-1016.
Patterson, A. D. et al., "Calibration of the cross-resonance two-qubit gate between directly-coupled transmons." Physical Review Applied, 2019, 12(6): 064013, pp. 1-8.

* cited by examiner

QUANTUM CHIP SYSTEM, QUANTUM COMPUTING PROCESSING SYSTEM AND ELECTRONIC APPARATUS

CROSS REFERENCE TO RELATED APPLICATIONS

This application is a National Stage of International Application No. PCT/CN2020/102572, filed on Jul. 17, 2020, which claims priority to Chinese Patent Application No. 201911039273.6, filed on Oct. 29, 2019; both of which are hereby incorporated by reference in their entireties.

TECHNICAL FIELD

The disclosure relates to the technical field of quantum chips, in particular to a quantum chip system, a quantum computing processing system and an electronic apparatus.

BACKGROUND

A quantum chip system includes, but is not limited to, control devices and qubits. A control device may include an event register. An event register is configured for registering an operation to be executed by the control device and instruct the control device to execute the corresponding operation. The control device controls the qubits to execute corresponding operations. For example, in a superconducting qubit chip system with adjustable frequency, the control device can be an arbitrary waveform generator. The qubits are controlled to execute computing operations through waveforms generated by the arbitrary waveform generator.

At present, quantum computers are used only in laboratories. Technicians have not yet designed a widely used quantum computing processing system that adapts to characteristics of quantum computing.

SUMMARY

Embodiments of the disclosure provide a new technical solution for a qubit system.

According to a first aspect of the disclosure, a quantum chip system is provided, comprising at least one first qubit, each first qubit comprising at least two control electrodes, and a first event register for controlling the control electrode, wherein each first event register is configured for storing a control waveform of the control electrode, and each first qubit corresponds to at least two first event registers.

According to a second aspect of the disclosure, a quantum computing processing system is provided and it includes: the quantum chip system according to the first aspect of the disclosure; and a decoding conversion apparatus which generates a quantum program to control operation of a quantum chip system.

According to a third aspect of the disclosure, an electronic apparatus is provided, including the quantum computing processing system according to the second aspect of the disclosure.

The quantum chip system in various embodiments can execute more flexible qubit operation processing.

Other features and advantages of the disclosure will become clear from detailed description of exemplary embodiments thereof with reference to the accompanying drawings.

BRIEF DESCRIPTION OF THE DRAWINGS

The accompanying drawings incorporated in the disclosure and forming a part of the disclosure show embodiments of the disclosure and are used together with its description to explain the principles of the disclosure.

DETAILED DESCRIPTION

Now various exemplary embodiments of the present disclosure will be described in detail with reference to the drawings.

In fact, the following description of at least one exemplary embodiment is for illustrative purposes only and is in no way intended to put any restriction on the present disclosure and its application or use.

It should be noted that similar reference numbers and letters represent similar items in the accompanying drawings. Therefore, once an item is defined in one of the drawings, it need not be discussed further in the subsequent drawings.

<Hardware Configuration>

Figure 1:
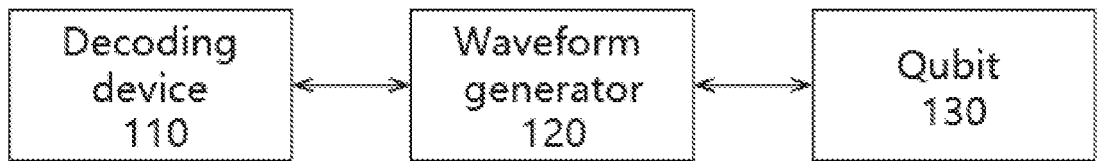
FIG. 1 shows a schematic diagram of the hardware configuration of a method that can be used to implement the embodiment of the present disclosure.

FIG. 1 is a schematic diagram that can be used to implement a hardware configuration of an embodiment of the disclosure, including a decoding device 110, a waveform generator 120 and a qubit 130.

The decoding device 110 is configured for decoding an input program into a quantum program. The decoding device 110 may be a classical computer, a special processing device, or the like. The input program can be a classical computer program, including C language programs, assembler programs, etc. in the prior art, or higher-level language programs for quantum computers. The decoding device 110 may convert a program correspondingly into a desired quantum program including quantum instructions. A quantum program is a program suitable for controlling qubits.

The waveform generator 120 is configured for generating a control waveform under the control of a quantum program. For example, the waveform generator 120 may be an arbitrary waveform generator based on FPGA. The waveform generator 120 is one of the qubit control devices that directly operate on qubits. Other qubit control devices can also be used depending on the qubits used in quantum computers. The qubit control device may also include an event register for registering the operation to be executed, for example, a control signal for the quantum operation to be executed.

The qubit 130 is configured for executing quantum computation under the action of a control waveform. For example, the qubit 130 may be semiconductor qubits, superconducting qubits, etc.

Here, the qubit control device and the qubit can be collectively referred to as a quantum chip system.

The above hardware configuration is for illustrative purposes only and is in no way intended to limit the technical solution of the embodiments of the disclosure.

<Quantum Chip System>

Figure 2:
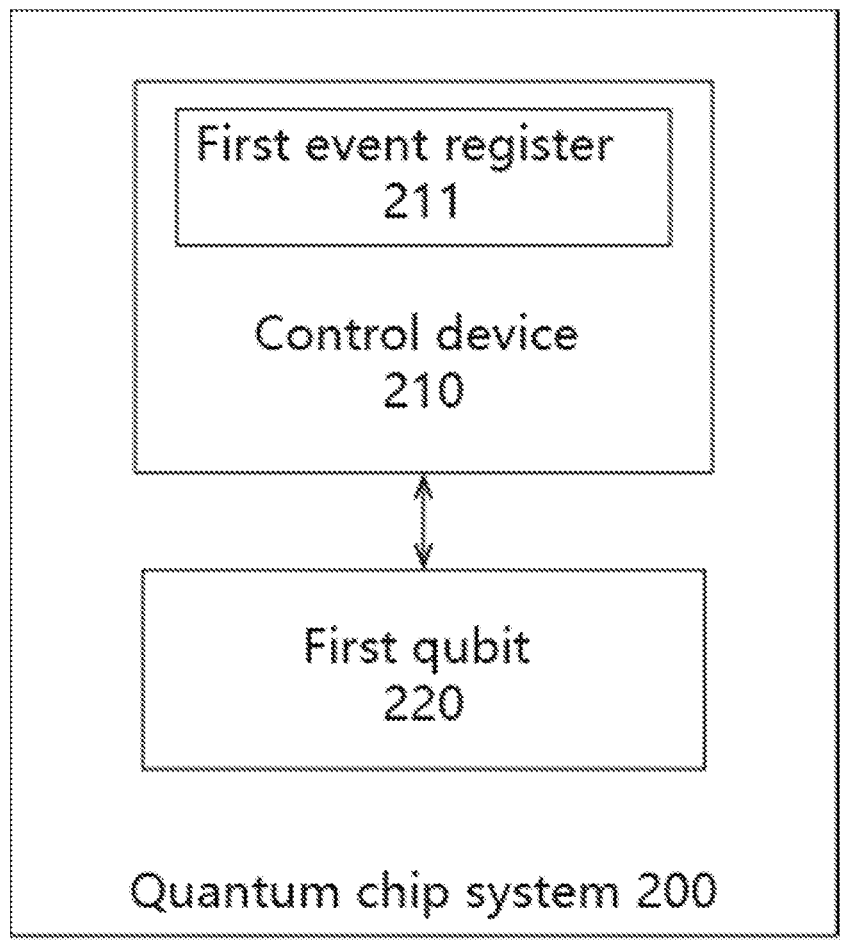
FIG. 2 shows a schematic block diagram of a quantum chip system according to one embodiment.

As shown in FIG. 2, a quantum chip system 200 includes a first event register 211 and at least one first qubit 220. Each first qubit 220 includes at least two control electrodes. The first event register 211 is configured for controlling the described control electrode. Each first event register 211 is configured for storing a control signal of the control electrode, and each first qubit 220 corresponds to at least two first event registers 211. Here, the control signal is a digital signal, which is configured for the subsequent control of the control electrode, and is not directly applied to the control electrode. The signal finally received by the control electrode is of the analog signal type.

Generally, the first event register 211 is included in a control device for controlling the first qubit 220. Different control devices 220 can be used depending on different implementations of the qubits. For example, for superconducting qubits with adjustable frequency, an arbitrary waveform generator can be used as a control device. The first event register 211 may be an event register for controlling any waveform generator 120 to generate a waveform.

Since the control method of the control device may depend on implementation of the qubits and is not focused here, detailed description on control method of the control device is omitted.

Testing is mainly considered in the current quantum chip system. Therefore, only one event register is required to control a qubit. This approach is convenient for testing application scenarios. However, this approach neither takes into account influence between qubits on each other, nor does it consider coding efficiency from the input instruction to the quantum instruction.

Here, considering difficulties encountered in practical application, the quantum chip system is designed to make each qubit correspond to at least two event registers. In this way, different control electrodes of qubits can be controlled simultaneously. On one hand, this can increase the flexibility of operating qubits; On the other hand, in this way, compensation can be performed during computing.

For example, at least one first event register 211 is configured for applying a null waveform to at least one control electrode of at least one first qubit 220 when the first qubit 220 executes a computing operation. The computing operation is executed without participation of a control electrode under control of the above described null waveform.

It should be noted that the control electrode is a hardware connected to the qubit, and is configured for applying a control waveform (which is classified as an analog signal) to the qubit, and a certain control waveform is applied to the qubit through a certain control electrode. Thus, this qubit is able to execute the computing operation corresponding to the control waveform, that is to say, the control electrode under control of the waveform participates in execution of the computing operation.

Here, owing to the null waveform, control of the control electrodes that do not participate in the computing of qubits can be strengthened, so as to prevent these control electrodes that do not participate in the computing from being influenced by the control electrodes involved in the computing.

On one hand, because of the complexity of the qubits themselves, the error rate of the computing results could be influenced to a certain extent if the states of the qubits that do not participate in the computing are not controlled.

On the other hand, compensation can be made in this way. For example, the null waveform corresponds to a compensation waveform of the control electrode under control of the null waveform. This compensation operation can eliminate the effect on the qubits performing the computing.

For example, the first qubit may be a superconducting qubit, preferably a superconducting qubit with adjustable frequency, and at least two control electrodes of the superconducting qubit include a microwave pulse control electrode and a DC pulse control electrode. In the superconducting quantum system, the microwave pulse control electrode is configured for applying the microwave pulse signal corresponding to quantum logic gate operations that controls rotation of the qubit around the X and Y axes. Deflection angle of the rotation axis and rotation angle of the qubit in its quantum state on the xy plane of the Bloch sphere can be controlled respectively by modulating phase and duration of the microwave pulse signal, wherein the rotation angle is determined by both amplitude and duration of the microwave pulse signal, and the DC pulse control electrode is configured for applying the DC pulse signal corresponding to the control qubit frequency. Therefore, the microwave pulse electrode can also be called as the XY (control) electrode, and the DC pulse control electrode can also be called as Z (control) electrode. The same also applies in the following text.

For a superconducting quantum chip system with adjustable frequency, if a DC pulse is applied in the Z direction of one qubit, crosstalk will occur and will change frequencies of other qubits. Therefore, to improve fidelity of logic gates, when a DC pulse is applied to a control electrode of one qubit in the Z direction, a compensation DC pulse (i.e. compensation waveform) can be applied simultaneously to control electrodes of other qubits in the Z direction, so as to neutralize the effect of crosstalk.

The compensation mechanism mentioned in this application is preferably applicable to superconducting qubits with adjustable frequencies, but it is not limited thereto. Other qubit systems that need to take compensation into consideration also fall within the scope of protection of this application.

Figure 3:
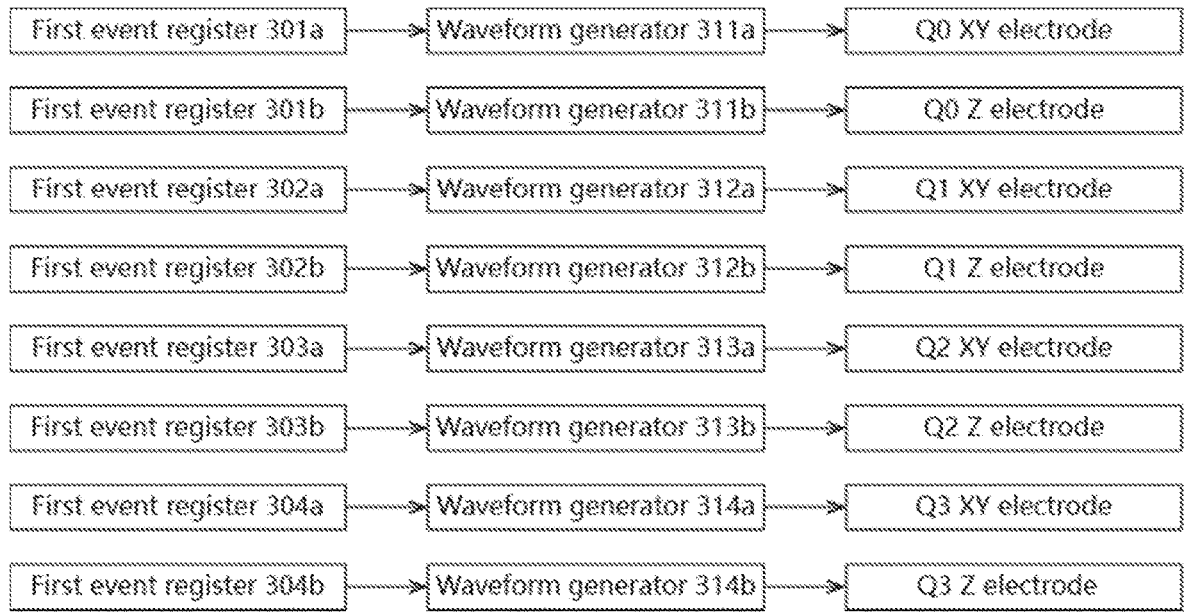
FIG. 3 shows a schematic diagram of an example of a quantum chip system.
Figure 4:
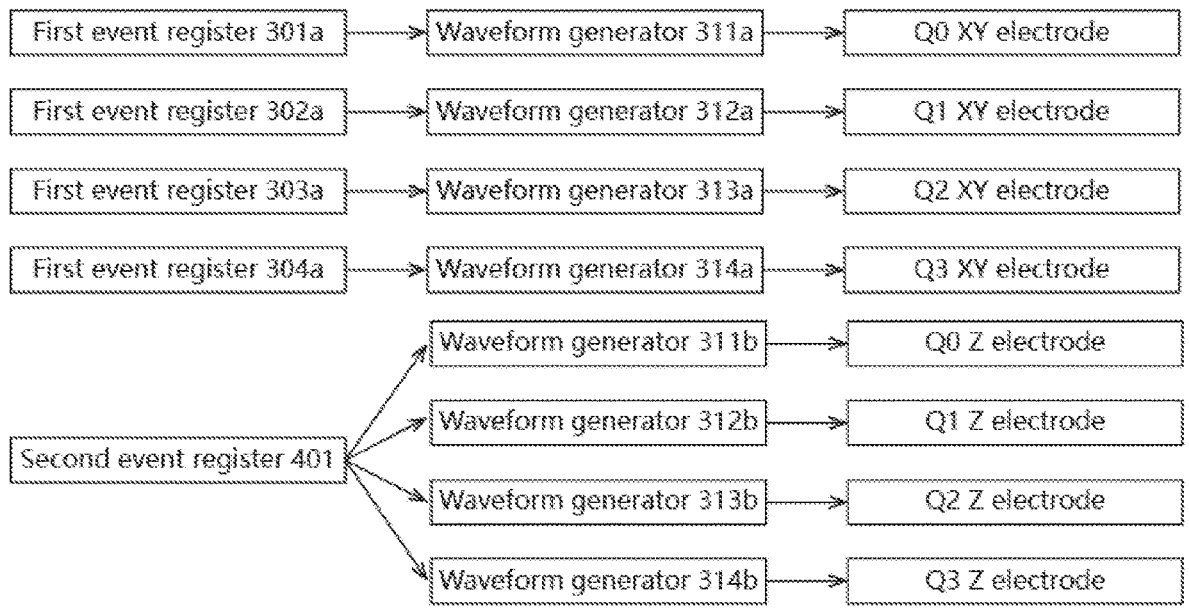
FIG. 4 shows a schematic diagram of another example of a quantum chip system.

FIG. 3 and FIG. 4 show two configurations of the first event register and qubits. FIG. 3 and FIG. 4 illustrate superconducting qubits with adjustable frequency as examples. However, those skilled in the art can understand from the present disclosure that similar configurations can also be used in applications such as semiconductor qubits and ion trap qubits.

On one hand, in a quantum chip system, every two or more first event registers can be allocated to one first qubit. Therefore, the number of the first event register is an integral multiple of that of the first qubit.

For example, four first qubits Q0, Q1, Q2, and Q3 are shown in FIG. 3. Each qubit has XY electrodes and Z electrodes, including a Q0 XY electrode, a Q0 Z electrode, a Q1 XY electrode, a Q1 Z electrode, a Q2 XY electrode, a Q2 Z electrode, a Q3 XY electrode and a Q3 Z electrode. By applying waveforms to the XY electrodes and Z electrodes of the first qubit, corresponding computing operations can be executed.

In FIG. 3, four first qubits Q0, Q1, Q2 and Q3 are provided with eight first event registers 301a, 301b, 302a, 302b, 303a, 303b, 304a and 304b. With the eight first event registers, an arbitrary waveform generator can be controlled to simultaneously trigger eight control waveforms, and apply the waveforms to corresponding electrodes. For clarity, eight waveform generators 311a, 311b, 312a, 312b, 313a, 313b, 314a, 314b are shown in FIG. 3. The eight waveform generators can be separated or integrated, wherein the arbitrary waveform generator does not directly generate the waveforms, instead, it stores a pre-generated waveform and sends a desired waveform by a triggering operation.

On the other hand, in a quantum chip system, multiple control electrodes can be controlled by one event register. For example, the first event register includes at least one second event register and each second event register can control the control electrodes of at least two first qubits, where "at least two" refer to the number of the first qubits.

FIG. 4 shows an example of a second event register. In FIG. 4, the second event register 401 is configured for controlling Z electrodes of at least two first qubits. From the view of the first qubit, each qubit still corresponds to two event registers. However, the total number of event registers is less than the example shown in FIG. 3.

Here, a common second event register can be configured for at least two control electrodes that have influence on each other, so as to reduce number of event registers while strengthening control.

Embodiment of Quantum Computing Processing System

Figure 5:
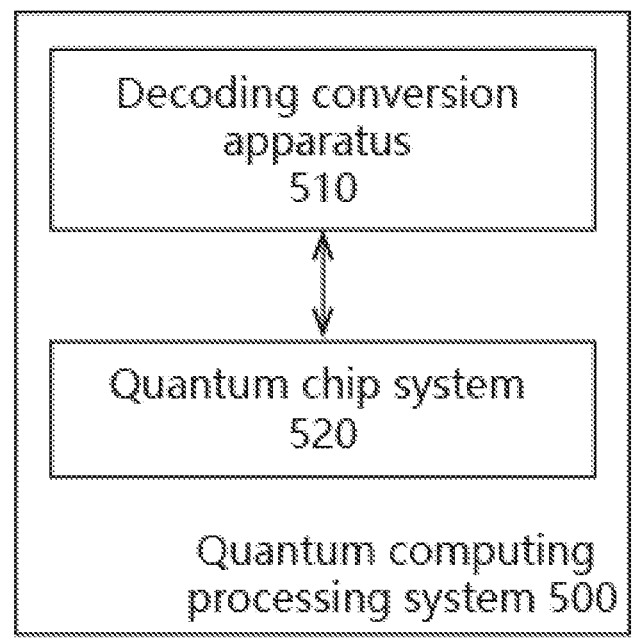
FIG. 5 shows a schematic block diagram of a quantum computing processing system according to one embodiment.

The present embodiment provides a quantum computing processing system, e.g. the computer processing system 500 as shown in FIG. 5, including a decoding conversion apparatus 510 and a quantum chip system 520, wherein the decoding conversion apparatus 510 generates a quantum program to control operation of the quantum chip system 520. The quantum chip system 520 is, for example, the quantum chip system described in the above embodiment.

The decoding conversion apparatus 510 may include: a device for obtaining input instructions of an input program; a device for converting at least one first input instruction among the input instructions into a first quantum instruction, wherein each first quantum instruction is configured for triggering waveforms of at least two logic gates that control qubits in a quantum chip system within a specific period of time; and a device for outputting a quantum program, wherein the quantum program corresponds to the input program and contains a first quantum instruction.

The input program stands for a program before it is converted into a quantum program. The input program can be a program expressed in an existing program language, a high-level quantum program expressed in a high-level quantum language, a quantum intermediate representation converted from a high-level quantum program, etc.

Accordingly, the input instruction stands for an instruction before it is converted into a quantum instruction. The input instruction can be an instruction expressed in an existing instruction language, a high-level quantum instruction expressed in a high-level quantum language, a quantum intermediate representation converted from a high-level quantum instruction, etc.

A quantum instruction is an instruction for generating a waveform that controls qubits in a quantum chip system within a specific period of time. A logic gate is a unit that implements evolution from an input state to an output state in data processing.

A logic gate is a basis for computing. Both quantum computers and classical computers realize computing through their own logic circuits, which logic circuits consist of logic gates. Due to different regulations followed by the two kinds of computers, substantial differences do exist between quantum logic gates and classical logic gates.

Quantum logic gates include, for example, an RX gate (a gate that rotates by an arbitrary angle around the X axis), an RY gate (a gate that rotates by an arbitrary angle around the Y axis), an RZ gate (a gate that rotates by an arbitrary angle around the Z axis), a CNOT gate (CONTROL-NOT, a gate for controlling a NOT-gate), etc.

Quantum logic gates can be classified into single-bit quantum logic gates, two-bit quantum logic gates, etc. A single qubit logic gate may be an RX gate, an RY gate, an RZ gate, etc. A two-bit quantum logic gate may be a CNOT gate, a CR gate (Cross Resonance gate), etc.

In this embodiment, each first quantum instruction is configured for triggering waveforms of at least two logic gates that control qubits in a quantum chip system for a specific period of time.

In one example, a first quantum instruction is configured for triggering waveforms that control two qubits to respectively execute an X-gate operation and a Y-gate operation within a specific period of time.

In another example, a first quantum instruction is configured for triggering waveforms that control two qubits to respectively execute an X-gate operation and a Y-gate operation, and control two qubits to execute a Z-gate operation within a specific period of time.

At least two logic gates involved in the first quantum instruction may be of different types or of the same type.

The quantum program corresponds to the input program, which means that the expected results of the series of operations of the computer (such as the quantum computer) instructed by the quantum program correspond to the expected results of the series of operations of the computer (such as the quantum computer) instructed by the input program.

With the decoding conversion apparatus 510, coding complexity is reduced at least to a certain extent, and instruction overhead of the quantum program is also reduced.

In addition, owing to simplicity of the instructions, the waveform generator can be directly invoked with fewer instructions (for example, with one instruction) to generate the desired waveform, and reduce the processing time from the quantum instruction to the trigger waveform.

In addition, in this way, less dependence of the upper instruction on the implementation of qubits can be achieved. As such, portability of quantum programs can be improved.

In addition, overall control of multiple qubits may be facilitated in this way, thus improving overall performance of qubits. For example, in this way, compensation to some qubits may be performed more conveniently.

In the decoding conversion apparatus 510, since each first quantum instruction is configured for triggering waveforms of at least two logic gates that control the qubits in the quantum chip system within a specific period of time, it is appropriate for the decoding conversion apparatus 510 to cooperate with the quantum chip system 520 to improve the overall performance. For example, the first quantum instructions output by the conversion device 510 can be decoded, and two control electrodes of one qubit can be simultaneously instructed to operate. In addition, compensation to some control electrodes can be performed based on an overall consideration.

The decoding conversion apparatus 510 may further include: a device for converting at least one second input instruction among the input instructions into a second quantum instruction, wherein each second quantum instruction is configured for generating a waveform of a single logic gate that controls qubits in the quantum chip system, wherein the quantum program further includes the second quantum instruction. In this way, the prior-art instruction coding mode based on logic gate can be compatible.

In one example, a second quantum instruction is configured for triggering a waveform of a single logic gate that controls qubits in a quantum chip system. A single logic gate is, for example, one of an RX gate, an RY gate, an RZ gate, a CZ gate (a control Z gate), a CNOT gate, etc.

At present, a measurement and control experiment scenario is one of the application scenarios of quantum programs. In the measurement and control experiment scenario, the quantum program is simpler, and there are a smaller number of qubits and logic gates. In this case, to describe quantum circuits based on a single logic gate will not cause a large instruction overhead to occur, and is simple and convenient.

In this embodiment, since the quantum program includes a second quantum instruction, it can be applied to the application scenario of the measurement and control experiment.

In one embodiment, the first input instruction is a program instruction that is more complex than the second input instruction. The decoding conversion apparatus 510 may further include a device for determining whether the input instruction is a first input instruction or a second input instruction.

In one example, the first input instruction is an input instruction in the quantum computing scenario, and the second input instruction is an input instruction in the measurement and control experiment scenario. The two scenarios are different in computation complexity, and the first input instruction is more complex than the second input instruction.

In the present embodiment, the type of the input instruction is determined, that is, to determine whether the input instruction is a first input instruction or a second input instruction.

The above mentioned determination can be performed based on a type identification of the input instruction (for example, the type identification is preset during editing of the instruction), or it can be performed based on complexity, length, etc. of the input instruction.

When it is determined that the input instruction is a first input instruction, the first input instruction is converted into a first quantum instruction.

When it is determined that the input instruction is a second input instruction, the second input instruction is converted into a second quantum instruction.

The decoding conversion apparatus 510 in this embodiment can take into account both the scenario in which the input instruction is simpler and the scenario in which the input instruction is more complex.

In one embodiment, each first quantum instruction is configured for triggering waveforms that control all relevant qubits in the quantum chip system within a specific period of time. The relevant qubits are a plurality of qubits for implementing the same quantum computing, for example, all the qubits included in the same quantum chip system.

In one embodiment, a first quantum instruction can be configured for triggering waveforms that control a plurality of qubits, and therefore, the plurality of qubits can be controlled with one first quantum instruction. In this case, there can be a smaller number of operands in the quantum instruction that correspond to the qubits, alternatively, there may be no operands corresponding to the qubits contained in the first quantum instruction.

An operand is an immediate number configured for encoding bit information for execution of quantum operations. For example, the operand 00000000000010 indicates to execute a certain single qubit logic gate operation of the first qubit. The operand 00000000001010 indicates to execute a certain two-qubit logic gate operation of the first qubit and the third qubit.

In the decoding conversion apparatus 510, by controlling all the relevant qubits without ad-hoc recording of the operands, the complexity of the instruction can be reduced, and the scalability of the system can be increased.

In one embodiment, the waveforms of at least two logic gates include a waveform corresponding to a null operation.

By applying a waveform corresponding to the null operation of the qubit, a null operation can occur, that is, to keep the state of the qubit unchanged.

In this embodiment, the first quantum instruction is configured for generating a waveform corresponding to a null operation, and can realize a null operation of a qubit. With the null operation, we can effectively control state of the electrodes that are not involved in the computing processing, unify the total length of the waveform, and achieve a better adaption to the quantum chip system. In addition, compensation can be performed on some electrodes. Therefore, the decoding conversion apparatus 510 can effectively cooperate with the quantum chip system 520, thereby improving overall performance.

Electronic Apparatus Embodiment

Figure 6:
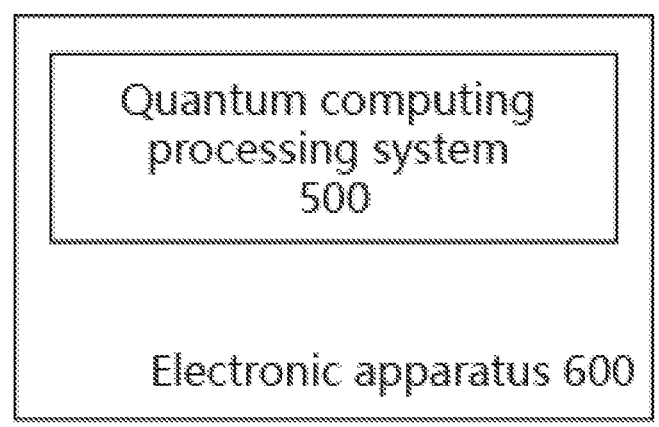
FIG. 6 shows a schematic block diagram of an electronic apparatus according to one embodiment.

The present embodiment provides an electronic apparatus. As shown in the FIG. 6, the electronic apparatus 600 includes a quantum computing processing system 500 described in the embodiment of the quantum computing processing system in the disclosure. In addition, with the development of technology, the quantum chip system can be used to replace silicon-based processing parts in traditional electronic apparatuses. In that case, for example, the electronic apparatus 600 may be a quantum computer or another electronic apparatus with data processing function, such as a server encryption/decryption device.

Unless clearly stated otherwise, such terms "first" and "second" as used herein are only for distinguishing things referred to by nouns that follow them, rather than to indicate order and/or priorities thereof.

The above embodiments can incorporate each other by reference. Therefore, for simplicity, repeated description of a former embodiment is omitted in the description of a latter embodiment.

Although the above description of certain embodiments of the disclosure is presented, there may also be other embodiments that are within the scope of the following claims. In some cases, actions or steps recorded in the claims may be performed in an order other than those described in the embodiments, while still bringing desired results. In addition, the desired results do not require a process illustrated in the drawings to necessarily follow the shown specific order or continuous order. In some embodiments, multitasking and parallel processing are also possible or may be advantageous.

The invention claimed is:

1. A quantum computing processing system, comprising:
A) a quantum chip system that comprises at least one first qubit, each first qubit comprising at least two control electrodes; and
a first event register for controlling the control electrode, wherein each first event register is configured for storing a control signal of the control electrode, and each first qubit corresponds to at least two first event registers;

wherein at least one first event register is configured for applying a null waveform to at least one control electrode of at least one first qubit when a computing operation is executed by a first qubit, wherein the computing operation is executed without participation of a control electrode under control of the null waveform; and B) a decoding conversion apparatus that generates a quantum program to control operation of the quantum chip system, wherein the decoding conversion apparatus comprises:

a device for obtaining input instructions of an input program;

a device for converting at least one first input instruction among the input instructions into a first quantum instruction, wherein each first quantum instruction is configured for triggering waveforms of at least two logic gates that control qubits in the quantum chip system within a specific period of time; and a device for outputting a quantum program, wherein the quantum program corresponds to the input program and contains a first quantum instruction.

2. The quantum computing processing system of claim 1, wherein the null waveform corresponds to a compensation waveform of the control electrode under control of the null waveform.

3. The quantum computing processing system of claim 1, wherein the first qubit is a superconducting qubit, and the at least two control electrodes comprise a microwave pulse control electrode and a DC pulse control electrode.

4. The quantum computing processing system of claim 1, wherein the first event register comprises at least one second event register, each second event register is configured for controlling control electrodes of at least two first qubits.

5. The quantum computing processing system of claim 4, wherein each second event register is configured for controlling DC pulse control electrodes of at least two first qubits.

6. The quantum computing processing system of claim 1, wherein the decoding conversion apparatus further comprises:

a device for converting at least one second input instruction among the input instructions into a second quantum instruction, wherein each second quantum instruction is configured for triggering a waveform of a single logic gate that controls qubits in the quantum chip system; and wherein the quantum program further comprises the second quantum instruction.

7. The quantum computing processing system of claim 6, wherein the first input instruction is a program instruction which is more complex than the second input instruction, wherein the decoding conversion apparatus further comprises:

a device for determining whether the input instruction is a first input instruction or a second input instruction.

8. The quantum computing processing system of claim 1, wherein each first quantum instruction is configured for triggering waveforms that control all relevant qubits in the quantum chip system within a specific period of time.

9. The quantum computing processing system of claim 1, wherein the first quantum instruction does not contain operands corresponding to qubits.

10. The quantum computing processing system of claim 1, wherein the waveforms of the at least two logic gates comprise a waveform corresponding to a null operation.

11. An electronic apparatus, comprising the quantum computing processing system of claim 1.

* * * * *